(12) United States Patent
Merscher

(10) Patent No.: US 9,845,959 B2
(45) Date of Patent: Dec. 19, 2017

(54) VENTILATION DEVICE FOR VENTILATION OF ROOMS IN BUILDINGS

(71) Applicant: LUNOS Luftungstechnik GmbH fur Raumluftsysteme, Berlin (DE)

(72) Inventor: Michael Merscher, Falkensee (DE)

(73) Assignee: LUNOS LUFTUNGSTECHNIK GMBH FUR RAUMLUFTSYSTEME, Berlin (DE)

( * ) Notice: Subject to any disclaimer, the term of this patent is extended or adjusted under 35 U.S.C. 154(b) by 372 days.

(21) Appl. No.: 14/595,438

(22) Filed: Jan. 13, 2015

(65) Prior Publication Data

US 2015/0198342 A1    Jul. 16, 2015

(30) Foreign Application Priority Data

Jan. 14, 2014  (DE) .................. 10 2014 200 538
Jan. 14, 2014  (DE) .................. 20 2014 003 368 U

(51) Int. Cl.
*F28F 27/00*  (2006.01)
*F24F 5/00*   (2006.01)
*F24F 11/00*  (2006.01)
*F24F 12/00*  (2006.01)
(Continued)

(52) U.S. Cl.
CPC .............. *F24F 5/00* (2013.01); *F24F 5/0017* (2013.01); *F24F 7/007* (2013.01); *F24F 11/0001* (2013.01); *F24F 11/0079* (2013.01); *F24F 12/001* (2013.01); *F24F 12/006* (2013.01); *F24F 2007/003* (2013.01); *F24F 2012/008* (2013.01); *F24F 2221/17* (2013.01);
(Continued)

(58) Field of Classification Search
CPC ....... F28D 17/02; F24F 7/08; F24F 2007/005; F28F 27/006

See application file for complete search history.

(56) References Cited

U.S. PATENT DOCUMENTS 4,799,539 A    1/1989  Atkin et al.
5,050,667 A    9/1991  Berner et al.
(Continued)

FOREIGN PATENT DOCUMENTS

DE    3006318 A1 *   8/1981  ............ F24F 12/002
DE    9116290 U1     8/1992
DE    4216387 A1     8/1993
(Continued)

*Primary Examiner* — Ljiljana Ciric

(74) *Attorney, Agent, or Firm* — Ware, Fressola, Maguire & Barber LLP

(57) ABSTRACT

A ventilation device for ventilating rooms, has a first air routing device for routing a first flow of air, the routing device having a first room-side outlet, a first flow space in which at least one first fan capable of bidirectional operation is arranged, and a first outside outlet; a second air routing device for routing a second flow of air, which is fluidically completely separate from the first air routing device and has a second room-side outlet, a second flow space in which at least one second fan capable of bidirectional operation is arranged, and a second outside outlet; an integral gas-solid heat exchanger adapted to route the first flow of air and the second flow of air in a respective set of passageways, in a fluidically separated but thermally coupled manner, wherein the solid in the first and the second air routing device additionally forms a respective regenerator.

18 Claims, 4 Drawing Sheets

(51) Int. Cl.
 *F24F 7/007* (2006.01)
 *F24F 7/00* (2006.01)
(52) U.S. Cl.
 CPC ........... *Y02B 30/563* (2013.01); *Y02B 30/746* (2013.01); *Y02E 60/147* (2013.01)

(56) References Cited

U.S. PATENT DOCUMENTS 5,230,719 A 7/1993 Berner et al.
5,647,741 A * 7/1997 Bunya .................... F23L 15/02
 432/159

FOREIGN PATENT DOCUMENTS

| DE | 4440436 A1 | 8/1995 | |
| DE | 19730019 C1 * | 1/1999 | ............ F24F 12/002 |
| DE | 202005011482 U1 | 11/2005 | |
| DE | 20 2009 017449 U1 | 5/2011 | |
| DE | 102011080358 A1 | 2/2013 | |
| DE | 102012204865 A1 * | 10/2013 | ............ F24F 5/0042 |
| EP | 0 196 175 A2 | 10/1986 | |
| EP | 2 101 137 B1 | 8/2012 | |
| WO | WO 2012155913 A1 * | 11/2012 | .............. F24F 7/065 |

\* cited by examiner

VENTILATION DEVICE FOR VENTILATION OF ROOMS IN BUILDINGS

CROSS REFERENCE TO RELATED APPLICATION

This application claims priority under 35 USC §119 to German Patent Application No. 102014200538.8 filed on Jan. 14, 2014 and German Patent Application No. 202014003368.4 filed on Jan. 14, 2014. Both applications are hereby incorporated by reference in their entirety.

TECHNICAL FIELD

The invention relates to a ventilation device for ventilation of rooms in buildings.

BACKGROUND OF THE INVENTION

Efficient ventilation of rooms, such as living space or office space, is becoming increasingly important in connection with energy-saving measures. Air exchange with outside air can be achieved by opening a window, but when the heating or air-conditioning is switched on, a large amount of thermal energy escapes through the window, or warm air flows into the cooled interior of the building. A substantial proportion of the energy used for heating or cooling is lost as a result. Furthermore, an open window is always associated with a greater risk of burglary.

For these reasons, systems have already been developed with which heat can be recovered decentrally when ventilating a room. In this context, "decentrally" means independently of any heating or cooling system that is installed. However, common systems require much space and project into the room, due to the heat storage units that are needed. Extensive construction measures are also necessary in order to install such systems.

DE 10 2011 080 368 describes a system which uses heat exchangers for heat recovery and which can be installed in a space-saving manner. The use of two recessed profiles operated alternately for uniform supply/exhaust ventilation is described in DE 10 2011 080358.

SUMMARY OF THE INVENTION

According to the present invention, a novel ventilation device for ventilation of rooms in buildings is proposed, said ventilation device comprising, in a common housing,
  a first air routing device for routing a first flow of air, having a first room-side outlet, a first flow space in which at least one first fan capable of bidirectional operation is arranged, and a first outside outlet,
  a second air routing device for routing a second flow of air, which is fluidically completely separate from the first air routing device and has a second room-side outlet, a second flow space in which at least one second fan capable of bidirectional operation is arranged, and a second outside outlet,
  an integral gas-solid heat exchanger, the solid of which extends inside the first and inside the second air routing device, is arranged in both air routing devices between the respective room-side and outside outlets, has a plurality of passageways and is adapted to route the first flow of air and the second flow of air in a respective set of passageways, in a fluidically separated but thermally coupled manner, wherein the solid in the first and the second air routing device additionally forms a respective regenerator,
  wherein the first and the second room-side outlets are arranged in a common room-side housing section, and the first and the second outside outlets are arranged in a common outside housing section, and
  wherein the first and the second flow space and the gas-solid heat exchanger are arranged in a common middle section of the housing.

In comparison with prior-art solutions, the ventilation device according to the invention allows the efficiency of heat recovery to be increased while at the same time further reducing the amount of space required.

Integrating both air routing devices in a common housing and with shared use of an integral gas-solid heat exchanger results in less space being required than is the case with ventilation devices known from the prior art, particularly since only one heat exchanger is used. The ventilation device according to the invention also allows simultaneous supply/exhaust ventilation to be installed in one wall opening, which substantially simplifies installation.

The gas-solid heat exchanger in the ventilation device according to the invention enhances the efficiency of heat recovery because, unlike the heat exchangers in conventional ventilation devices, it is able to regenerate heat in a manner known per se, in that it is able to temporarily store heat from a flow of air in intermediate storage and to transfer such heat to a flow of air in the opposite direction, yet additionally is also able to transfer heat from the first flow of air to the second flow of air or from the second flow of air to the first flow of air.

The present description uses only the expression "outlet", but that expression should be understood in the general sense as any opening through which air can flow. In operation, air flows through both the first and the second room-side outlets, as well as the first and second outside outlets, in one of two possible and opposite directions, depending in each case on the direction of rotation of the respective fan capable of bidirectional operation. They thus function selectively either as an inlet or as an outlet for air. Depending on the direction of rotation, the air can thus flow through the outlets either into the ventilation device or out of it.

Advantageous embodiments shall now be described.

In one advantageous embodiment, the first room-side outlet and the second room-side outlet are laterally arranged on opposite sides of the room-side housing section. In this embodiment, the first and the second flows of air enter or exit the respective outlet in parallel or antiparallel, depending on the direction of flow, with the first and the second flow of air being completely separated from each other fluidically in the room-side housing section. The arrangement of outlets on the room side allows additional spatial separation of the flows of air at the transition between the room and the ventilation device. In counterflow operation, the extracted air is sucked in at a distance from freshly inducted air, thus preventing the two airflows from mixing with each other.

In one preferred embodiment, the first outside outlet and the second outside outlet are laterally arranged on opposite sides of the outside housing section. In this embodiment, air that has just been extracted from the room is prevented from being sucked back in again by the resultant distance between the first and the second outside outlets.

In another embodiment, the ventilation device preferably has at least one seal which is disposed inside the housing, immediately adjacent the solid, said seal having a first through opening exposing a first set of passageways in the solid for the first flow of air and having a second through opening exposing a second set of passageways in the solid for the second flow of air. Such a seal is able to form a seal against the outside elements, while also providing an additional safeguard that the first and the second flow of air are also separated fluidically from each other directly where the air flows into the solid of the heat exchanger.

The first or the second fan, or the first and the second fan, has a fan impeller which can be rotated about a rotational axis, wherein said rotational axis is slanted at an angle to a longitudinal orientation of the passageways in the solid. In this way, the airflow is swirled additionally before entering the heat exchanger, with the result that air can flow more uniformly onto the heat exchanger. Such a fan arrangement also results in low power consumption by the fan. It is particularly advantageous in this regard when the respective rotational axis of the fan impeller is at an angle of between 30° and 60° relative to a longitudinal orientation of the passageways in the solid.

It is preferred that the first or the second fan or the first and the second fan is an axial fan. However, a radial fan may also be used.

In yet another embodiment, the axial fan has a fan impeller, the outer circumference of which can be described by a circle in at least one plane perpendicular to the fan axis, and in which a flow equalisation distance equal with a variation of at most 20% to the radius of the circle is maintained between the fan and the solid. The variation is preferably in a range below 10%. It is particularly advantageous when the flow equalisation distance is exactly equal to the radius of the circle.

Due to the flow equalisation distance that the fan maintains from the heat exchanging solid, a flow of air generated by the fan passes uniformly through the heat exchanging material. Dead flow zones of fans—zones that are generally arranged around the centre of axial fans, or due to the structure of radial fans—no longer have the effect of preventing a sufficient flow of air onto the heat exchanging material. It is possible, instead, that heat is also stored or returned in regions through which insufficient air flows, due to a dead zone of the fan, when a fan is located immediately adjacent the heat exchanging material. The problem of poor efficiency that otherwise arises is thus avoided.

In summary, the concept of a flow equalisation distance prevents dead zones and substantially improves efficiency.

If no flow equalisation distance is maintained, an axial fan, for example, will blow air unevenly into the heat exchanger. Air will flow much more strongly through an outer region of the cross-sectional area than through a central region of the cross-sectional area. As a result, the central region will not be sufficiently preheated by warm air. In the second cycle, i.e. when outside air is sucked through, the heat exchanger will be uniformly perfused, but colder air will now flow in the central region of the cross-sectional area of the heat exchanger, because only little thermal energy is stored in that region. The efficiency of the heat exchanger as a whole will therefore suffer as a result. By providing the flow equalisation distance, in contrast, the airflow of the fan is swirled and broken in such a way that the air flows uniformly through the heat exchanger in both the outer region and the central region, also during the first cycle, and heats those regions uniformly, so that heat can be dissipated equally uniformly in the outer and the central regions to outside air flowing into the heat exchanger.

In one preferred embodiment, the solid of the gas-solid heat exchanger is made of ceramic. More particularly, a silicate ceramic such as alumina porcelain or cordierite is a suitable material for the solid. These ceramics have sufficient thermal conductivity and a high specific heat capacity.

The plurality of passageways in the solid preferably has a honeycomb structure, in particular a hexagonal cross-section. A characteristic feature of such honeycomb structures is their improved rigidity. However, it is also possible for the passageways to have round or rectangular cross-sections.

In another embodiment, the ventilation device has an electronic control unit in the housing, said control unit being adapted to put the first or the second fan into operation on receiving a control signal and with a speed and direction of rotation defined by said control signal. The control signal may not only be generated directly at the ventilation device, for example by user input, but can also be received from a central controller, for example. In the latter case, the control signal can be received via a cable connection or also by wireless transmission. Different fan speeds correspond to different volumetric flow rates of the respective airflows.

The control unit is preferably adapted to operate the first and the second fan in a push-pull mode with opposite directions of rotation on receiving a respective control signal. The fans in the decentral ventilation device thus run simultaneously in opposite directions of rotation (push-pull mode), i.e., one fan conveys outside air into the room where the device is installed, while the other fan conveys the waste air out of the room to outdoors, that is to say to the outside. In the "exhaust" phase, thermal energy is removed from the flow of exhaust air by the heat exchanger. This thermal energy is released to the supply air again in the "supply" phase. Regenerative heat transfer occurs during the latter phase, as a result of which the outside air is heated and supplied as supply air to the room. Heat is also exchanged between the simultaneous flows of exhaust air and supply air. In addition, reversing the direction of rotation prevents the formation of condensation.

The control unit is preferably adapted to reverse the direction of rotation of the first and the second fan according to a predetermined cycle time on receiving a respective control signal. The phase time for changing the direction of fan rotation in each air routing device is preferably approximately 50 seconds.

The ventilation device can also be operated in "summer mode", in which heat recovery becomes secondary due to the small temperature differences between the room and the outdoor surroundings. In that case, the direction of rotation is not reversed, and both fans remain permanently in one direction of rotation, i.e., while one fan extracts air to the outside, the other fan supplies air to the room. As a result, there is no generation of underpressure or overpressure. This mode also saves energy.

In another embodiment, the control unit is adapted to operate the first and the second fan with the same direction of rotation in a parallel mode on receiving a respective control signal. In addition to operation with a heat recovery system, the ventilation device can also be operated purely as an exhaust or supply ventilation system (e.g. for extracting air quickly from bathrooms. WCs or kitchens), with one or both fans being run in extractor or supply mode. In that case, the volumetric rate of exhaust or supply air flow is increased accordingly.

In one preferred embodiment of the ventilation device, the middle section of the housing is designed as a pipe. The pipe serves as a wall duct for installation in an outside wall.

The installation depth of the ventilation device is preferably variable and can be adjusted to the respective wall thickness in a range between 300 mm and 500 mm.

A filter is preferably disposed between the first or the second or the first and second room-side outlet and the respective fan; a filter foam, in particular, is preferred in this regard.

In push-pull mode, volumetric flow rates between the room and the outside can be adjusted, using the control unit, to rates of 5, 10, 15 and 20 m$^3$ per hour, for example. In parallel mode, volumetric flow rates of, for example, 10, 20, 30 and 45 m$^3$ per hour can be set. A rate of 45 m$^3$ per hour is achieved by one motor of the fan not operating at 100% of its nominal power in the normal push-pull mode, and by using this "reserve" power for operation in exhaust or supply mode.

The ventilation device is advantageously installed in an outer wall, with a slight inclination towards the outside (1-3" inclination). By providing this inclination when installing the device, any condensation that arises is reliably guided to the outside.

In order to close the ventilation device (e.g. in the event of a chemical accident and an announcement to "please close all windows and doors"), the ventilation device is fitted with magnetic sealing films. The outlets on the room side are fitted with a honeycomb protective screen such that direct infererence with the device is prevented. The magnetic sealing films can be magnetically attached to the protective screen from the inside (on the side of the protective screen facing away from the room) and also from the outside (on the side of the protective screen facing toward the room). Due to the adhesive force of the magnet, the film rests against the screen, completely sealing the device on all sides against the outside air.

Embodiments can also be found in the claims.

BRIEF DESCRIPTION OF THE DRAWINGS

Further embodiments of the ventilation device shall now be described with reference to the drawings, in which.

DETAILED DESCRIPTION

Figure 1:
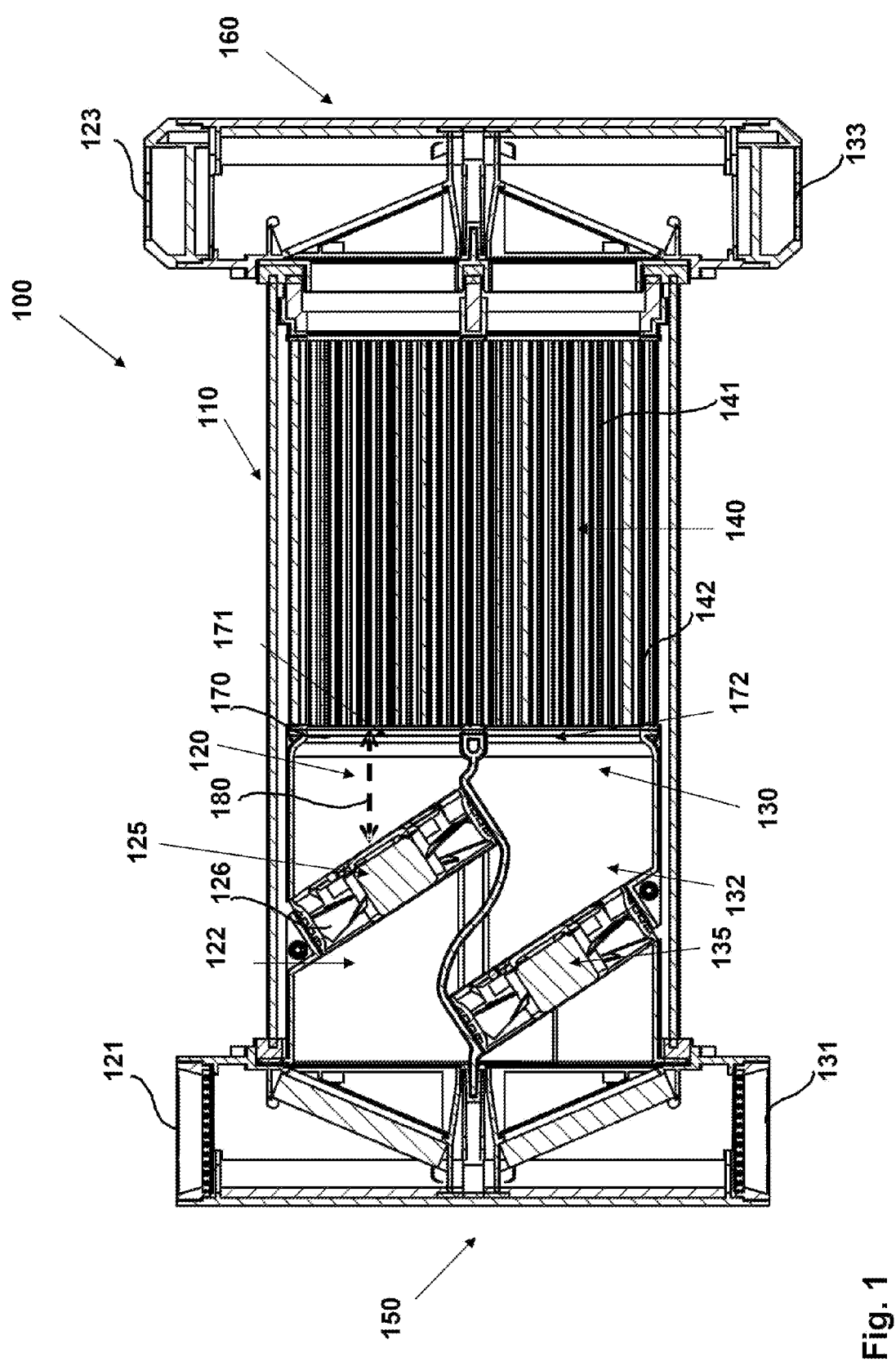
FIG. 1 shows a schematic view in cross-section of an embodiment of a ventilation device for ventilating rooms according to the invention.

FIG. 1 shows, in a schematic cross-sectional view, a ventilation device 100 for ventilating rooms, comprising a common housing 110 in which a first air routing device 120 and a second air routing device 130, which is fluidically completely separate from the first air routing device 120, are arranged. The first air routing device 120 has a first room-side outlet 121, a first flow space 122 in which at least one first fan 125 capable of bidirectional operation is arranged, and a first outside outlet 123. The second air routing device 130 also has a second room-side outlet 131, a second flow space 132 having a second fan 135 capable of bidirectional operation and a second outside outlet 133.

An integral gas-solid heat exchanger 140 is also arranged in the common housing 110. The solid 141 of the gas-solid heat exchanger extends inside the first and the second air routing device 120, 130, and in both air routing devices is arranged between the respective room-side outlets 121, 131 and outside outlets 123, 133. Solid 141 has a plurality of passageways 142. Solid 141 is adapted to route a first flow of air, which is guided in the first air routing device 120, and a second flow of air, which is guided in the second air routing device 130, in a respective set of passageways 142 in a fluidically separated but thermally coupled manner. Solid 141 in the first and in the second air routing device 120, 130 forms a respective regenerator. The first and the second flow space 122, 132 and the gas-solid heat exchanger 140 are arranged in a common middle section of housing 110. The first and the second room-side outlets 121, 131 are arranged fluidically completely separately in a common room-side housing section 150. The first and the second outside outlets 123, 133 are also arranged fluidically completely separately in a common outside housing section 160.

In the embodiment of ventilation device 100 shown, the first room-side outlet 121 and the second room-side outlet 131 are laterally arranged on opposite sides of room-side housing section 150. The first outside outlet 123 and the second outside outlet 133 are also arranged on opposite sides of the outside housing section 160. This arrangement of the first and second outlets on opposite sides of the respective housing section allows fresh air to be injected spatially separately from the extracted air, particularly in counterflow operation. This prevent flows of air in opposite directions from mixing with each other. Another arrangement of the respective first and second outlets in relation to each other is also conceivable, specifically to take constructional aspects of installing the ventilation device into consideration. In the embodiment shown, ventilation device 100 has a seal 170 immediately adjacent solid 141 of the gas-solid heat exchanger 140 inside housing 110, said seal having a first through opening 171 exposing a first set of passageways in the solid and having a second through opening 172 exposing a second set of passageways in the solid. This seal provides an additional safeguard for fluidic separation of the first and second flows of air in the first air routing device 120 and in the second air routing device 130.

In the embodiment shown, the first and second fans 126, 135 have a fan impeller 126, 136 which can be rotated about a rotational axis, wherein said rotational axis is slanted at an angle to a longitudinal orientation of passageways 142 in the solid. With the aid of this arrangement, the airflow is swirled additionally before entering the heat exchanger, with the result that air can flow more uniformly onto heat exchanger 140. Such a fan arrangement also results in lower power consumption by the fan. In the embodiment shown, the rotational axis forms an angle of 40° with the longitudinal orientation of passageways 142 in the solid. In other embodiments, the angle between the rotational axis of fan impeller 126, 136 and the longitudinal orientation of passageways 142 is advantageously an angle between 30° and 60°. In the embodiment shown, fans 125, 135 are axial fans, but a radial fan may also be used in other embodiments of the invention.

In the embodiment shown, fan 125 in the first air routing device 120 is arranged at a flow equalisation distance 180 from the solid. The purpose of this flow equalisation distance is to provide a uniform airflow onto the heat exchanging material. The flow equalisation distance is advantageously derived from the radius of a circle by which the outer circumference of the fan impeller can be described in at least one plane perpendicular to the fan axis, with a variation of at most 20%. In the embodiment shown here, there is a difference between the distance of the first fan from solid 141 and the distance of the second fan 135 from solid 141. This arrangement results in the ventilation device having a more compact construction. In other embodiments of the ventilation device which are not shown here, the two fans 125, 135 are arranged at equal distances from the solid. In the embodiment shown, solid 141 is made of cordierite. Like other silicate ceramics, cordierite has sufficient thermal conductivity and a high specific heat capacity, so it can be used not only as a regenerator, but also as a recuperator. The plurality of passageways 142 in solid 141 have a honeycomb structure of hexagonal cross-section.

In other embodiments of the ventilation device, the cross-sections of the passageways are round, or can also be rectangular.

Figure 2:
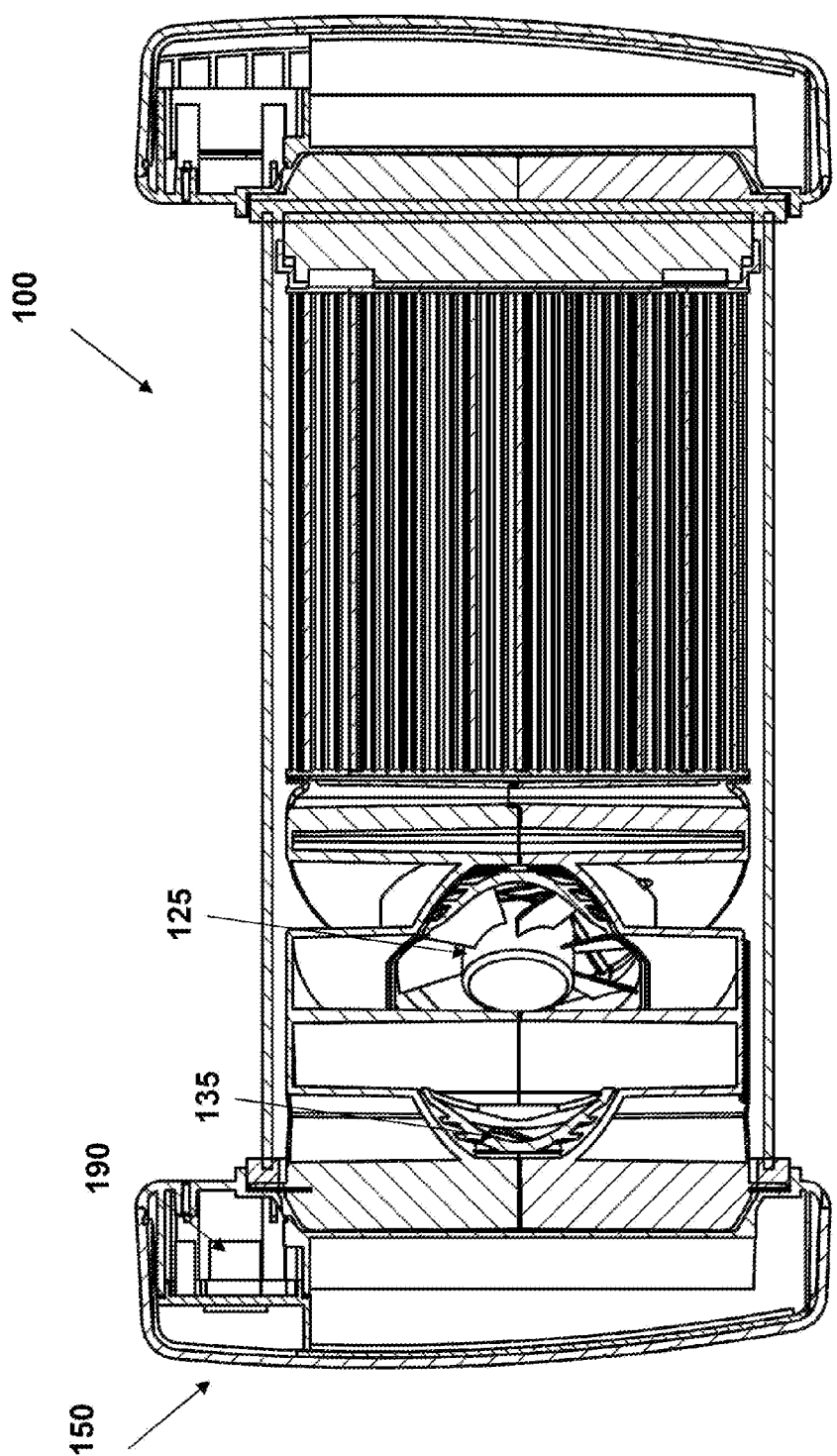
FIG. 2 shows a schematic view of the embodiment shown in FIG. 1, in a cross-sectional view perpendicular to the cross-section in FIG. 1.

FIG. 2 shows the ventilation device of FIG. 1 in a sectional plane perpendicular to the sectional plane of FIG. 1. In addition to the components of ventilation device 100 already described with reference to FIG. 1, a control unit 190 in room-side housing section 150 can be seen in FIG. 2. Said control unit is adapted to put the first or the second fan 125, 135 into operation on receiving a control signal, with a speed and direction of rotation defined by said control signal. The control signal may not only be generated directly at the ventilation device, for example by user input, but can also be received from a central controller, for example. Different fan speeds correspond to different volumetric flow rates of the respective airflows. The control unit in the present embodiment is adapted to operate the first and the second fan 125, 135 in a push-pull mode with opposite directions of rotation on receiving a respective control signal. This means that the first fan 125, for example, conveys outside air through the first air routing device 120 into the room, while the second fan conveys inside air through the second air routing device 130 to the outside. In the "exhaust" phase of ventilation, in this case of the second fan 135, heat is removed from the flow of exhaust air by heat exchanger 140. This heat is partly transferred to the supply air flowing simultaneously through the first air routing device 120. If the direction of fan rotation is now reversed, the second air routing device 130 in this example will supply air to the room in the next phase. In this phase, the heat previously transferred to the heat exchanger is now transferred regeneratively to the stream of supply air in the second air routing device 130.

In other embodiments, the control unit is further adapted to operate the first and the second fan 126, 126 with the same direction of rotation in a parallel mode on receiving a respective control signal. In this operating mode, it is possible to supply or extract air faster, using a greater volumetric flow rate of exhaust or supply air.

Figure 3:
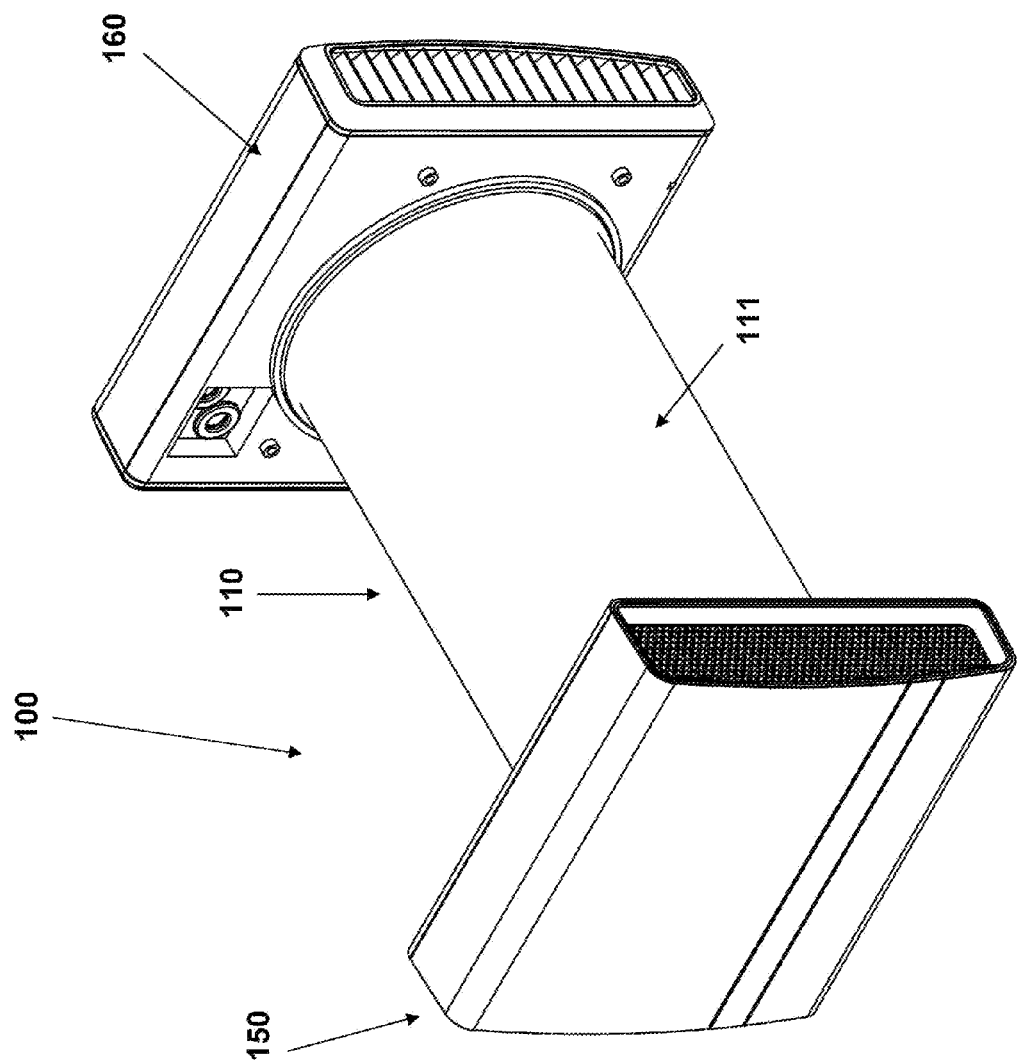
FIG. 3 shows a perspective view of the embodiment of the ventilation device shown in FIG. 1 and FIG. 2.

FIG. 3 shows a perspective view of the ventilation device of FIG. 1 and FIG. 2. In this view, the structure of the common housing 110, comprising a middle section 111 and room-side housing section 150 and outside housing section 160, can be seen in the embodiment shown, the middle section 111 of housing 110 is in the form of a pipe. In this embodiment, the pipe serves as a wall duct for installation in an outside wall.

Figure 4:
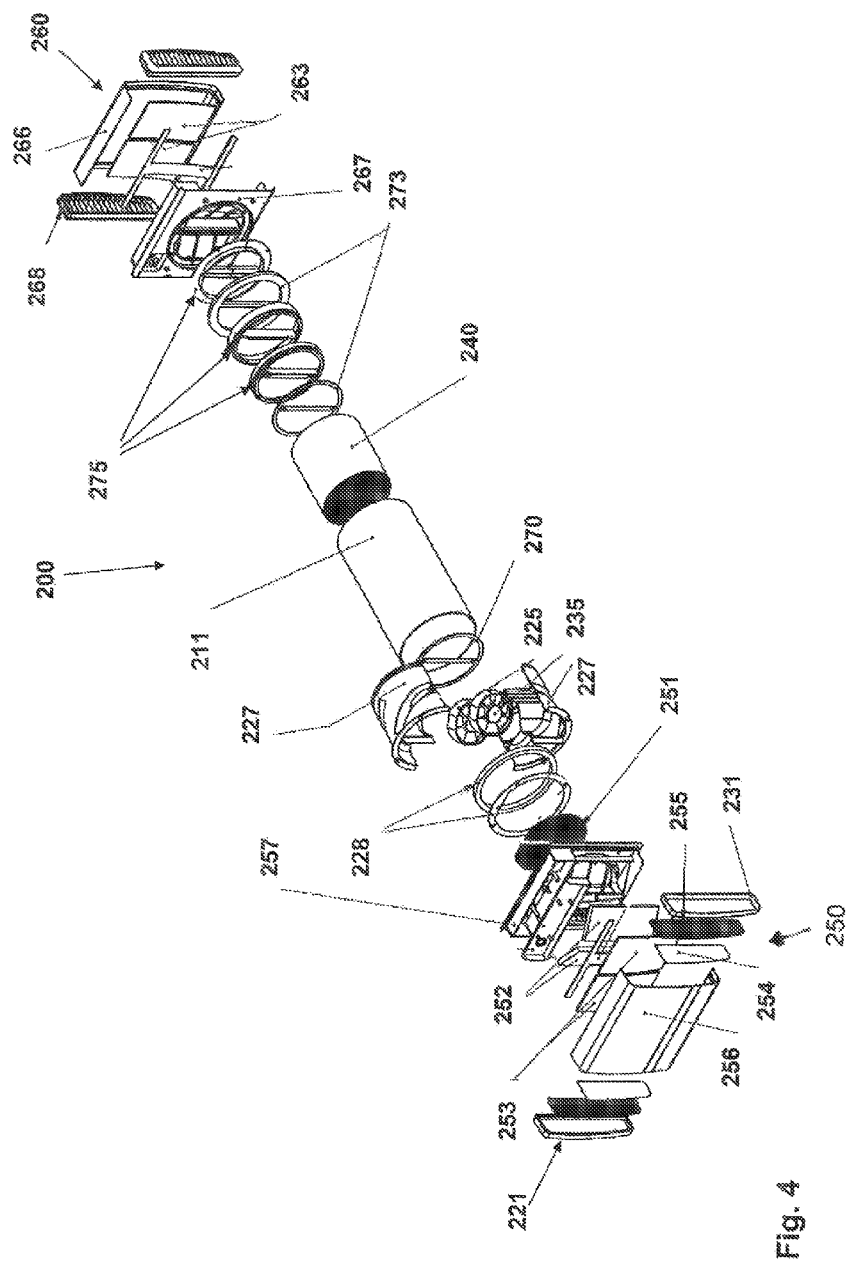
FIG. 4 shows an exploded view of another embodiment of the ventilation device for ventilating rooms, in accordance with the invention.

FIG. 4 shows an exploded view of another embodiment of ventilation device 200 for ventilating rooms, in accordance with the invention. The ventilation device has a common housing with a middle section 211 in the form of a pipe. A heat exchanger 240 is arranged in the pipe. In the embodiment shown, there is also a fan housing 227 inside the housing, with a first fan 225 and a second fan 235 arranged therein. The first fan 225 is arranged in a first flow space 222, while the second fan 235 is arranged in a second flow space 232. Two O-rings 228 which seal the air routing devices inside the ventilation device against the outside are disposed immediately adjacent fan housing 227. Further seals 270, 273 and various adapter rings 275 are arranged adjacent heat exchanger 240. Protective screen 251 as well as filter 252 and insulators 253 are arranged in room-side housing section 250, which contains the first and second room-side outlets 221, 231. In the embodiment shown, the room-side housing section 250 also has magnetic sealing films 254 which can be fixed from the inside to a metal honeycomb screen 255. The ventilation device can be sealed against the outside with the aid of these films, for example in the event of a chemical accident and the announcement to "please close all windows and doors". The room-side housing section also has a room-side cover 256 and a further cover 257 facing toward the middle section of the housing. The outside housing section 260 has a cover 266 facing outdoors and a further cover 267 facing toward the middle section of the housing. There are also insulators 263 arranged in the outside housing section 260. The outside outlets are secured against entry of foreign matter by side covers 268.

The invention claimed is:

1. A ventilation device for ventilation of rooms in buildings, comprising, in a common housing,
   a first air routing device for routing a first flow of air, having a first room-side outlet, a first flow space in which at least one first fan capable of bidirectional operation is arranged, and a first outside outlet,
   a second air routing device for routing a second flow of air, which is fluidically completely separate from the first air routing device and has a second room-side outlet, a second flow space in which at least one second fan capable of bidirectional operation is arranged, and a second outside outlet,
   an integral gas-solid heat exchanger, the solid of which extends inside the first and inside the second air routing devices, is arranged in both air routing devices between the respective room-side and outside outlets, has a plurality of passageways and is adapted to route the first flow of air and the second flow of air in a respective set of passageways, in a fluidically separated but thermally coupled manner, wherein the solid in the first and the second air routing devices additionally forms a respective regenerator,
   wherein the first and the second room-side outlets are arranged fluidically completely separately in a common room-side housing section, and the first and the second outside outlets are arranged fluidically completely separately in a common outside housing section, and
   wherein the first and the second flow spaces and the gas-solid heat exchanger are arranged in a common middle section of the housing.

2. The ventilation device according to claim 1, wherein the first room-side outlet and the second room-side outlet are laterally arranged on opposite sides of the room-side housing section.

3. The ventilation device according to claim 2, wherein the first outside outlet and the second outside outlet are laterally arranged on opposite sides of the outside housing section.

4. The ventilation device according to claim 3, wherein at least one seal is disposed inside the housing, immediately adjacent the solid, said seal having a first through opening exposing a first set of passageways in the solid for the first flow of air and having a second through opening exposing a second set of passageways in the solid for the second flow of air.

5. The ventilation device according to claim 4, wherein the first or the second fan or the first and the second fan has a fan impeller which can be rotated about a rotational axis, wherein said rotational axis is slanted at an angle to a longitudinal orientation of the passageways in the solid.

6. The ventilation device according to claim 1, wherein the first or the second fan or the first and the second fan is an axial fan.

7. The ventilation device according to claim 6, wherein the axial fan has a fan impeller, the outer circumference of which can be described by a circle in at least one plane perpendicular to the fan axis, and in which a flow equalisation distance equal with a variation of at most 20% to the radius of the circle is maintained between the fan and the solid.

8. The ventilation device according to claim 1, wherein the solid of the gas-solid heat exchanger is made of a ceramic.

9. The ventilation device according to claim 8, wherein the ceramic is a silicate ceramic.

10. The ventilation device according to claim 9, said ventilation device having an electronic control unit in the housing, said control unit being adapted to put the first or the second fan into operation on receiving a control signal and with a speed and direction of rotation defined by said control signal.

11. The ventilation device according to claim 1, wherein a control unit is adapted to operate the first and the second fan in a push-pull mode with opposite directions of rotation on receiving a respective control signal.

12. The ventilation device according to claim 11, wherein the control unit is adapted to reverse the direction of rotation of the first and the second fan after a predetermined cycle time on receiving a respective control signal.

13. The ventilation device according to claim 12, wherein the control unit is adapted to operate the first and the second fan with the same direction of rotation in parallel mode on receiving a respective control signal.

14. The ventilation device according to claim 1, wherein the first outside outlet and the second outside outlet are laterally arranged on opposite sides of the outside housing section.

15. The ventilation device according to claim 1, wherein at least one seal is disposed inside the housing, immediately adjacent the solid, said seal having a first through opening exposing a first set of passageways in the solid for the first flow of air and having a second through opening exposing a second set of passageways in the solid for the second flow of air.

16. The ventilation device according to claim 1, wherein the first or the second fan or the first and the second fan has a fan impeller which can be rotated about a rotational axis, wherein said rotational axis is slanted at an angle to a longitudinal orientation of the passageways in the solid.

17. The ventilation device according to claim 1, said ventilation device having an electronic control unit in the housing, said control unit being adapted to put the first or the second fan into operation on receiving a control signal and with a speed and direction of rotation defined by said control signal.

18. The ventilation device according to claim 17, wherein the control unit is adapted to reverse the direction of rotation of the first and the second fan after a predetermined cycle time on receiving a respective control signal.

* * * * *